United States Patent

Sandhu et al.

[11] Patent Number: 5,975,594
[45] Date of Patent: Nov. 2, 1999

[54] GLOVE BOX DOOR LATCH ASSEMBLY WITH UTILITY HOOK

[75] Inventors: Chain Sandhu, Farmington Hills; Hugo Magi, Bloomfield Hills, both of Mich.

[73] Assignee: NYX, Inc., Livonia, Mich.

[21] Appl. No.: 09/023,519

[22] Filed: Feb. 13, 1998

[51] Int. Cl.$^6$ .................... E05C 1/12; E04G 3/00; B60R 11/00
[52] U.S. Cl. ............... 292/173; 292/163; 292/DIG. 31; 248/294.1; 248/292.13; 224/553
[58] Field of Search .................. 248/304–306, 248/308, 292.12, 292.13, 294.1, 291.1; 224/483, 277, 282, 560, 561, 549, 553, 525, 925, 927; 292/163–165, 169, 173, 202, DIG. 31, 194, 219, 226, 228, 195, DIG. 38

[56] References Cited

U.S. PATENT DOCUMENTS

| | | | |
|---|---|---|---|
| 3,289,985 | 12/1966 | Sheiman ................ | 248/294.1 |
| 3,385,547 | 5/1968 | West ................ | 248/304 |
| 3,782,139 | 1/1974 | Rubner ................ | 292/169 |
| 4,544,192 | 10/1985 | Angle et al. ................ | 292/341.18 |
| 4,720,028 | 1/1988 | Takemura et al. ................ | 224/273 |
| 5,098,141 | 3/1992 | Bull ................ | 292/252 |
| 5,246,190 | 9/1993 | Swirkal ................ | 248/100 |
| 5,263,346 | 11/1993 | Sato et al. ................ | 292/DIG. 38 |
| 5,292,159 | 3/1994 | Sandhu et al. ................ | 292/DIG. 31 |
| 5,388,901 | 2/1995 | Asano ................ | 292/219 |
| 5,411,233 | 5/1995 | Grimes, III et al. ................ | 248/305 |
| 5,586,674 | 12/1996 | Nachbauer ................ | 248/308 |
| 5,593,009 | 1/1997 | King ................ | 248/308 |
| 5,630,630 | 5/1997 | Price et al. ................ | 292/DIG. 30 |
| 5,769,294 | 6/1998 | Heinz et al. ................ | 224/549 |
| 5,782,510 | 7/1998 | Gass ................ | 292/165 |
| 5,823,583 | 10/1998 | Sandhu et al. ................ | 292/DIG. 31 |

*Primary Examiner*—Steven Meyers
*Assistant Examiner*—Teri Pham
*Attorney, Agent, or Firm*—Brooks & Kushman P.C.

[57] ABSTRACT

A vehicle glove box door latch assembly includes a housing with a central opening formed therein and a latch handle positioned substantially within the central opening. The latch handle is operative to actuate unlatching of the latch assembly. A utility hook is positioned substantially within the central opening and pivotally connected to the housing for pivotal movement between a stowed position within the central opening and a use position extended from the central opening. The utility hook is pivotable independently of the latch handle.

4 Claims, 2 Drawing Sheets

GLOVE BOX DOOR LATCH ASSEMBLY WITH UTILITY HOOK

TECHNICAL FIELD

The present invention relates to a glove box door latch assembly, and more particularly to a glove box door latch assembly including a utility hook extendable therefrom.

BACKGROUND OF THE INVENTION

Vehicle glove box door assemblies typically comprise a plurality of plastic components, including a bin, a door, and a latch assembly for selectively latching the glove box in the closed position. Such assemblies typically do not include any kind of utility hook or hanger for hanging various items, such as purses.

It is desirable to provide a utility hook on a glove box door assembly in a manner in which glove box door operation is not interfered with, and in which the aesthetic appearance of the glove box door assembly is not adversely affected.

DISCLOSURE OF THE INVENTION

The present invention overcomes the above-referenced shortcoming of prior art vehicle glove box door assemblies by providing a glove box door latch assembly which includes an integral utility hook. The hook is pivotally mounted within the glove box door latch housing, and does not interfere with operation of the glove box door latch.

More specifically, the present invention provides a vehicle glove box door latch assembly including a housing having a central opening and a latch handle positioned within the central opening. The latch handle is operative to actuate unlatching of the latch assembly. A utility hook is positioned substantially within the central opening and pivotally connected to the housing for pivotal movement between a stowed position within the central opening and a use position extended from the central opening. The utility hook is pivotable independently of the latch handle assembly.

In a preferred embodiment, the utility hook includes a detent engageable with a flexible notch formed in the housing for securing the utility hook in the stowed position. Also, a torsional spring pivotally biases the utility hook toward the use position.

Accordingly, an object of the present invention is to provide a glove box door latch assembly in which a utility hook is extendable from the glove box door latch housing for access by vehicle occupants.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
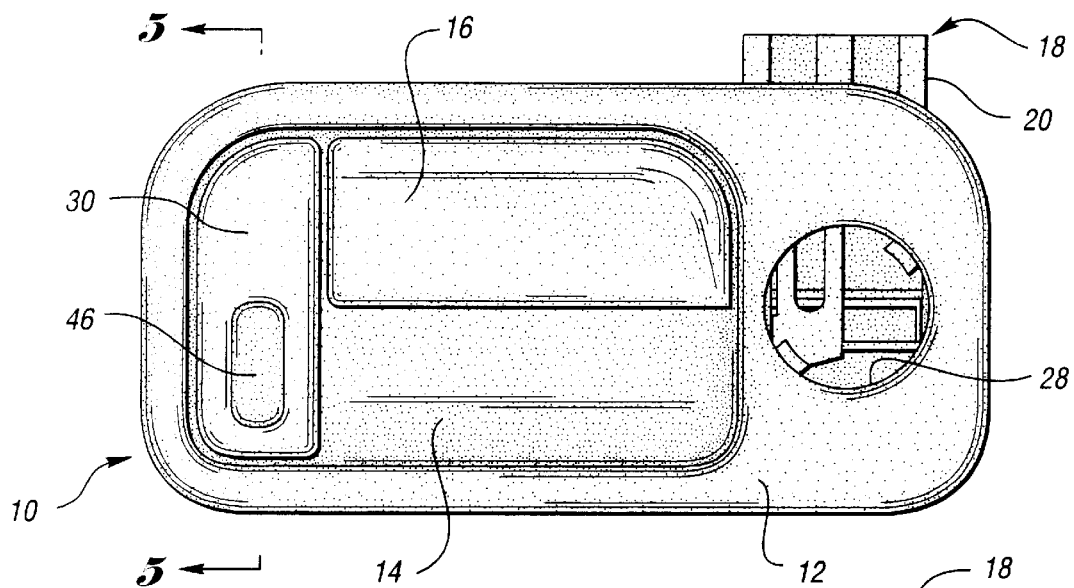
FIG. 1 shows a front plan view of a vehicle glove box door latch assembly in accordance with the present invention.

Referring to FIGS. 1–7, a vehicle glove box door latch assembly 10 is shown in accordance with the present invention. The glove box door latch assembly 10 includes a plastic housing 12 with a central opening 14 formed therein.

A latch handle 16 is positioned substantially within the central opening 14, and is operative to actuate unlatching of the latch mechanism 18, which is positioned within the longitudinally extending chamber 20. By rotating the latch handle 16 on the handle shaft 22, the latch pawl 24 shown in FIG. 2 may be moved against the force of the spring 26 for unlatching the latch mechanism 18.

A lock cylinder opening 28 is also provided in the housing 12 for receiving appropriate locking apparatus for preventing movement of the latch pawl 24 when locked.

Figure 2:
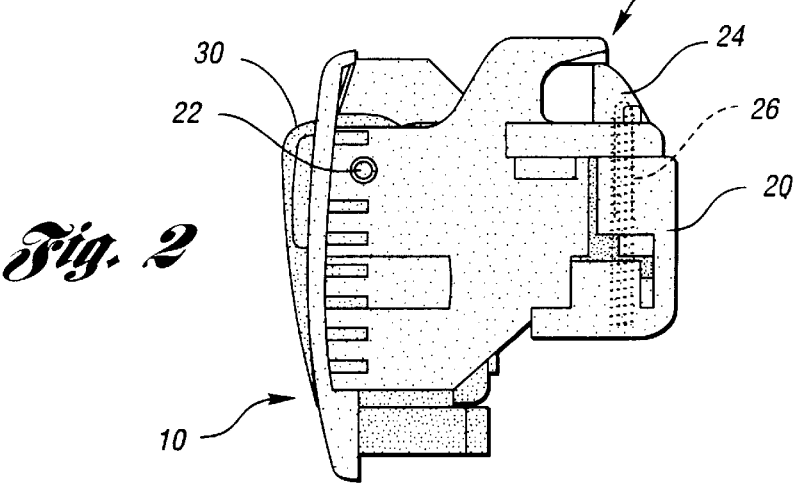
FIG. 2 shows a right end view of the glove box door latch assembly of FIG. 1.
Figures 4, 5:
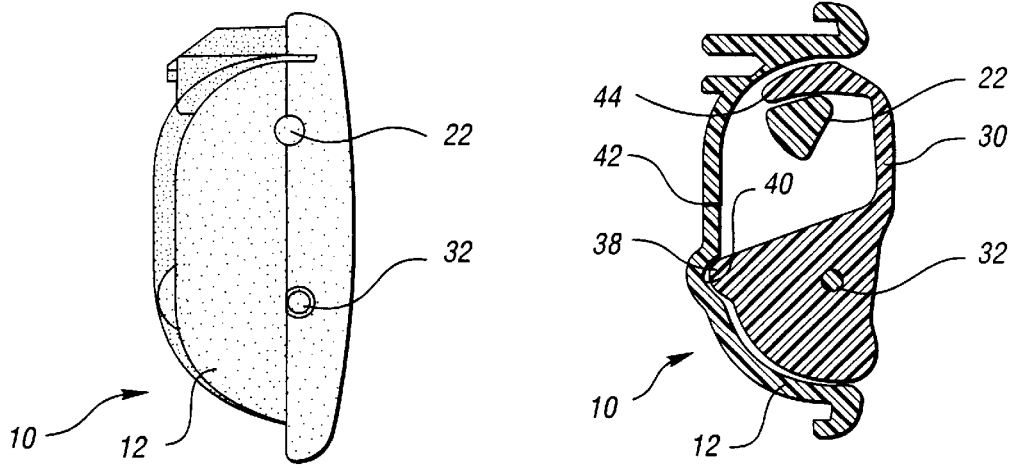
FIG. 4 shows a left end view of the glove box door latch assembly of FIG. 1.
FIG. 5 shows a vertical cross-sectional view taken at line 5—5 of FIG. 1.
Figure 6:
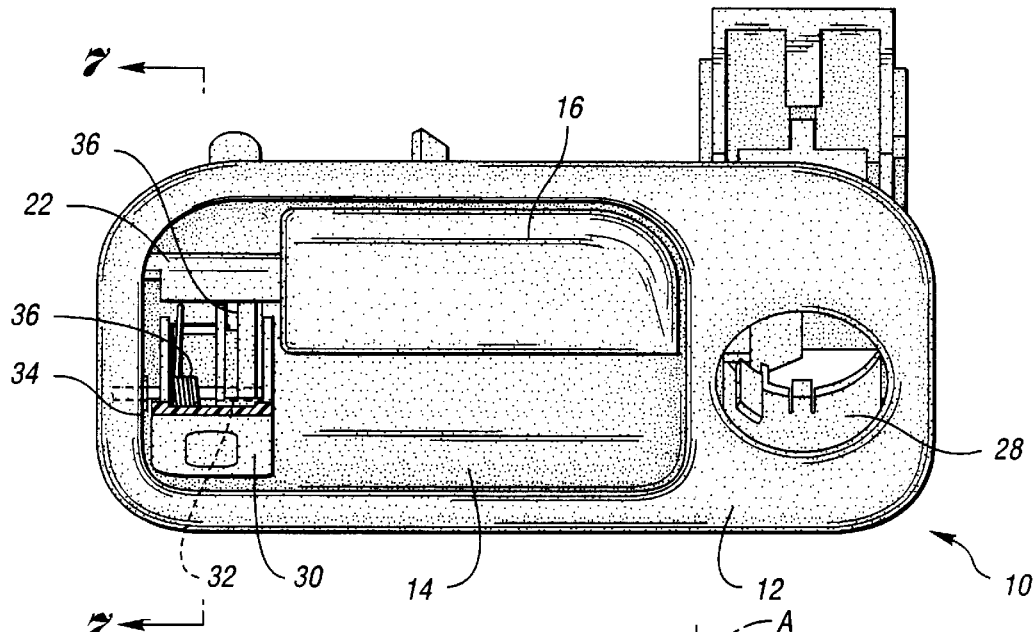
FIG. 6 shows a front perspective view of the glove box door latch assembly of FIG. 1 with the utility hook in the open position.
Figure 7:
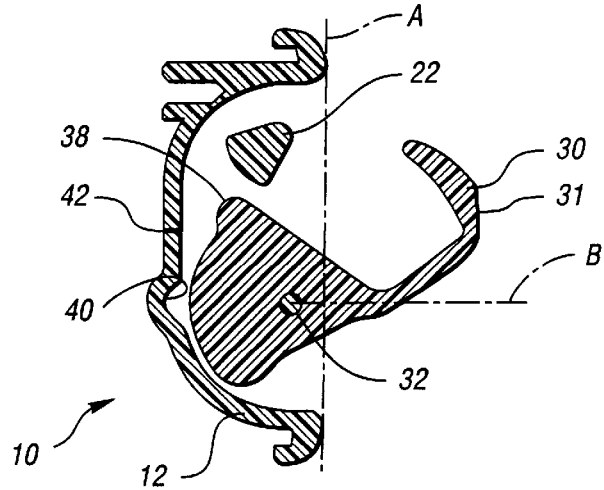
FIG. 7 shows a sectional view taken at line 7—7 of FIG. 6.

The present invention provides a utility hook 30 positioned substantially within the central opening 14 for pivotal movement between a stowed position within the central opening 14, as shown in FIGS. 1, 2 and 5, and a use position extended from the central opening 14, as shown in FIGS. 6 and 7. As shown, the utility hook 30 is pivotable independently of the latch handle 16.

The utility hook 30 is mounted by a rod 32 between the side 34 of central opening 14 and an upstanding rib 36. The rod 32 includes a torsional spring 48 therearound, shown in FIG. 6, pivotally biasing the utility hook 30 toward the extended use position, shown in FIG. 7.

Figure 3:
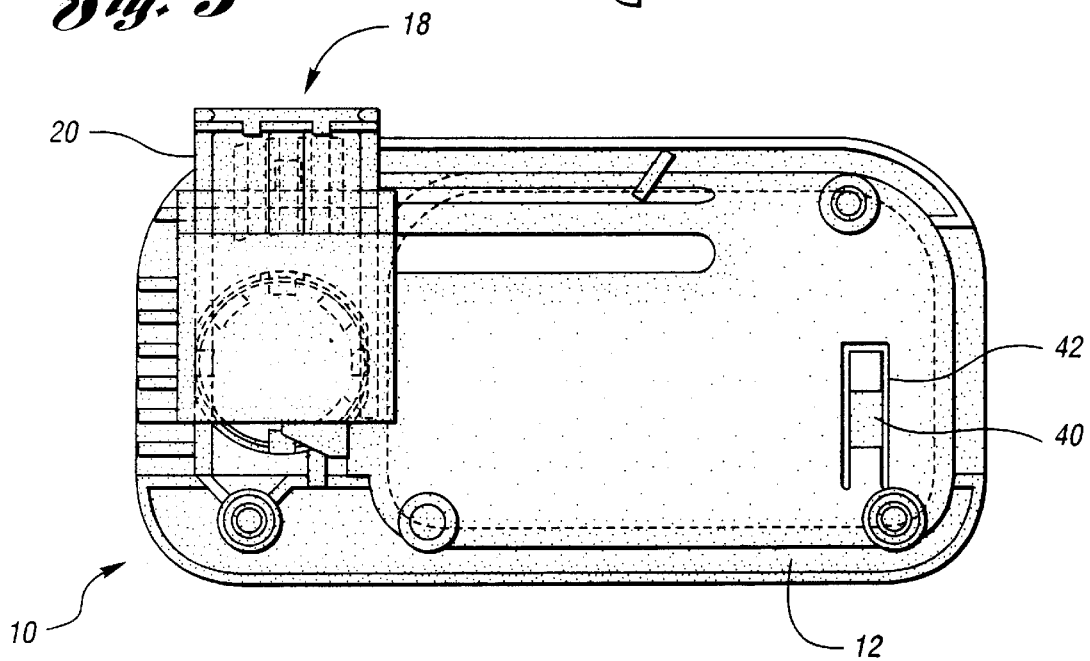
FIG. 3 shows a rear view of the glove box door latch assembly of FIG. 1.

As shown in FIGS. 5 and 7, the utility hook 30 includes a detent 38 which is engageable within a flexible notch 40 formed in the housing 12. The flexible notch 40 is formed as a portion of a flexible tab which is movable with respect to the remainder of the housing 12 by means of the slit 42 which extends around the notch 40, as shown in FIG. 3.

As shown in FIG. 5, the utility hook 30 includes a distal end portion 44 which extends at least partially around the handle shaft 22 when in the stowed position, such that the utility hook 30 does not interfere with operation of the latch handle 16 and handle shaft 22.

As shown in FIG. 1, the utility hook 30 also includes a button portion 46 which, when pushed, causes rotation of the utility hook 30 about the rod 32 because the button portion 46 is offset from the rod 32. This rotation will cause release of the detent 38 from the flexible notch 40 for allowing rotation of the utility hook 30 about the utility hook rod 32 for movement from the stowed position to the use position. The molded-in arm which forms the detent 38 provides a spring force which assists in pushing the hook 30 to the use position. Also, the molded-in arm cushions sound when opening the hook 30 and prevents the hook 30 and housing 12 from contacting each other. The arm also provides pressure against the rod 32 through the hook 30, thereby preventing the handle 16 from rattling.

Accordingly, the utility hook 30 achieves the stated object of providing a glove box door latch assembly with a utility hook which is extendable from the glove box door latch housing for easy access by vehicle occupants. The utility hook 30 is normally in the stowed position, as shown in FIGS. 1, 2 and 5, and is easily rotated to the extended use position, shown in FIGS. 6 and 7, by pressing upon the button portion 46 of the utility hook 30 to cause rotation thereof to the use position. When in the use position, the utility hook is appropriately positioned for supporting a purse, bag, or other item.

As further illustrated in FIG. 7, the front face of the housing 12 forms a plane A, and a line B is shown perpendicular to the plane A and intersecting the utility hook rod 32. The utility hook 30 includes a planar front face 31 which is substantially parallel to the plane A, and positioned above line B such that engagement of an occupant with the planar front face 31 will cause rotation of the utility hook 30 about the rod 32 such that the utility hook 30 automatically closes when engaged by an occupant in a vehicle crash. This feature satisfies safety requirements and allows the utility hook to be positioned on the glove box door in front of a vehicle occupant without causing risk of injury.

While the best mode for carrying out the invention has been described in detail, those familiar with the art to which this invention relates will recognize various alternative designs and embodiments for practicing the invention within the scope of the appended claims.

What is claimed is:

1. A vehicle glove box door latch assembly, comprising:

a housing having a central opening;

a latch handle positioned substantially within the central opening and operative to actuate unlatching of the latch assembly;

a utility hook positioned substantially within the central opening and pivotally connected to the housing for pivotal movement between a stowed position within the central opening and a use position extended from the central opening, said utility hook being pivotable independently of the latch handle;

wherein the utility hook comprises a detent engageable with a flexible notch formed in the housing for securing the utility hook in the stowed position;

a torsional spring pivotally biasing the utility hook toward the use position; and wherein a front face of the housing forms a plane A, and the utility hook includes a planar front face which is generally parallel to the plane A when the hook is in the use position and positioned above a line B which is perpendicular to the plane A and intersects the pivotal connection between the utility hook and the housing, wherein the planar front face lies in the area between the plane A and line B such that engagement of an occupant against the planar front face causes the utility hook to pivot about the pivotal connection to the stowed position, thereby preventing injury to the vehicle occupant in a vehicle crash.

2. The glove box door latch assembly of claim 1, further comprising a rib extending from the housing with an aperture extending therethrough for receiving a pin for pivotally supporting the utility hook.

3. The glove box door latch assembly of claim 2, wherein the handle is pivotally connected to the housing by means of a handle shaft, and wherein the utility hook extends at least partially around the handle shaft when in the stowed position.

4. The glove box door latch assembly of claim 1, wherein the utility hook comprises a button portion for causing release of the detent and rotation of the utility hook.

* * * * *